E. G. CATE.
BUTTER DISHES.
No. 183,283. Patented Oct. 17, 1876.
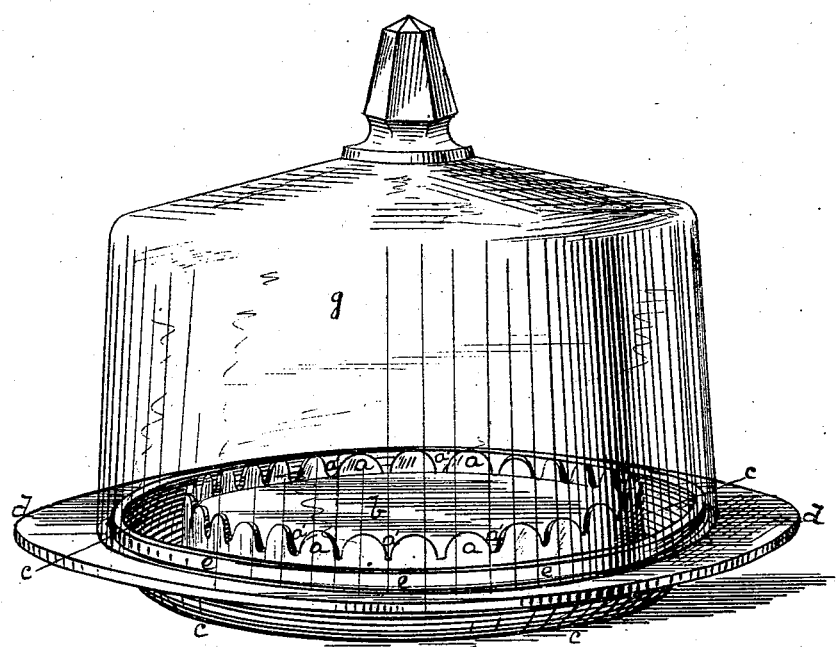
Fig. 1.
Fig. 2.
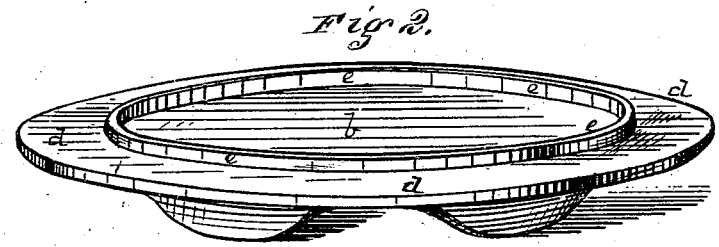
Witnesses
Inventor
Elijah G. Cate
By George H. Christy
his Atty

UNITED STATES PATENT OFFICE.

ELIJAH G. CATE, OF BRIDGEPORT, OHIO, ASSIGNOR TO LA BELLE GLASS COMPANY, OF SAME PLACE.

IMPROVEMENT IN BUTTER-DISHES.

Specification forming part of Letters Patent No. 183,283, dated October 17, 1876; application filed July 3, 1876.

*To all whom it may concern:*

Be it known that I, ELIJAH G. CATE, of Bridgeport, county of Belmont, State of Ohio, have invented or discovered a new and useful Improvement in Glass Butter-Dish; and I do hereby declare the following to be a full, clear, concise, and exact description thereof, reference being had to the accompanying drawing, making a part of this specification, in which—like letters indicating like parts—

Figure 1 is a view in perspective of my improved butter-dish and cover. Fig. 2 is a like view of a cheese-dish, showing a portion of my improvement applied thereto.

In butter-dishes heretofore, it has been common to make a drain-cup immediately under the butter-plate, with drain-holes from the latter to the former, the plate on which the butter rests being removable for convenience in cleaning; also, the raised rim or side which surrounds the butter-plate has commonly been made close in order to keep the butter in place on the plate, which results in the necessity of cutting obliquely down in removing the quantity of butter which a host or guest may desire to use; also, covers are most commonly seated inside the outer raised rim, whereby the lower edge of the cover is liable to come in contact with detached portions of the butter, so that the cover cannot then be laid off without either inverting it or soiling the table-cloth.

The two difficulties last named are also experienced in the use of cheese-plates as heretofore made.

My improved butter-dish consists of a central plate, *b*, of any desired shape, having a raised rim, *a*, broken at intervals down to the level of the plate, so as to give drain spaces or openings *a'* from the plate *b* to an annular drain-cup, *c*. As shown in the drawing, the raised rim *a* is broken or interrupted at such short intervals that it constitutes a series of vertically-projecting guards to keep the butter on the plate *b* from sliding laterally off, but the intermediate openings may, if so preferred, be less frequent, and in fact the rim may be continuous, with drain-holes through it at or about the level of the surface of the plate. The drain cup *c*, as shown, extends entirely around the plate *b*, but this is not essential, as a separate drain-cup may be made for each drain-hole or opening, though with less advantage. The bottom of the drain-cup is sufficiently below the level of the plate *b* to provide for the drainage desired, and is preferably extended down far enough to constitute a support for the dish to stand on, and leave the rim *d* sufficiently high to be readily taken hold of. On the rim *d*, outside the drain-cup *c*, I make a raised collar or annulus, *e*, outside of which I seat the cover *g*, the latter being made of any desired height and design. The level of the plate *b* is so near the level of the outer rim *d*, the annulus *e* being comparatively shallow, that the desired quantity of butter can be cut off by a practically straight vertical cut. There is no movable bottom to get out of place or get lost, or tip to one side in case the butter is hard, nor any concealed receptacle for the accumulation of filth. The drainage is perfect, and the cover-seat is protected as against danger of detached pieces of butter getting thereon to soil the cover, and, through it, the table-cloth.

The dish described is preferably made by pressing it of glass in suitable molds in the way usually practised in making glass dishes, and the cover is blown or pressed as is commonly done, and both with the usual or common finishing operations. Feet may be added to either dish, if so desired.

I claim as my invention—

As a new article of manufacture, a butter-dish, having a plate, *b*, surrounded by a raised rim broken or perforated at intervals, a depressed drain-cup outside the same, a cover-seat outside the drain-cup, and a raised annulus, *e*, inside the cover-seat, substantially as set forth.

In testimony whereof I have hereunto set my hand.

ELIJAH G. CATE.

Witnesses:
O. S. BOGGS,
F. C. WINSHIP.